March 24, 1936.  H. HERITIER  2,035,387
BRAKE FOR MOVABLE PARTS
Filed Jan. 4, 1934  2 Sheets-Sheet 1
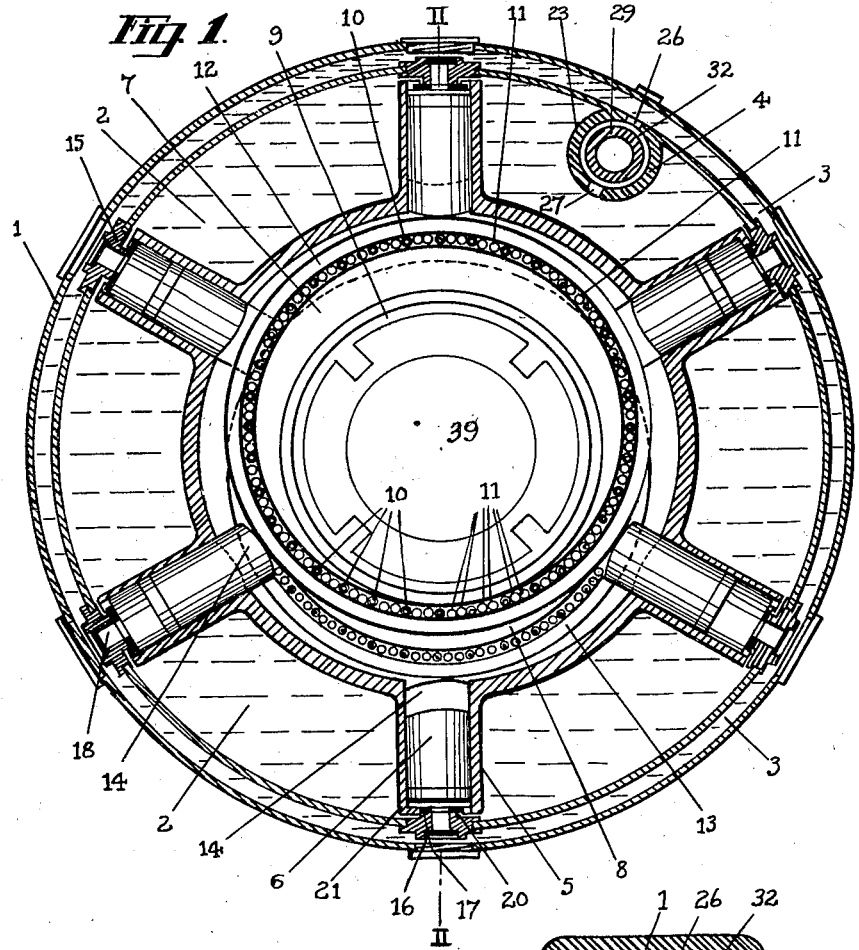
INVENTOR:
HENRI HERITIER.
By Chatwin & Company Atty.

March 24, 1936.                    H. HERITIER                    2,035,387
                               BRAKE FOR MOVABLE PARTS
                                Filed Jan. 4, 1934                 2 Sheets-Sheet 2
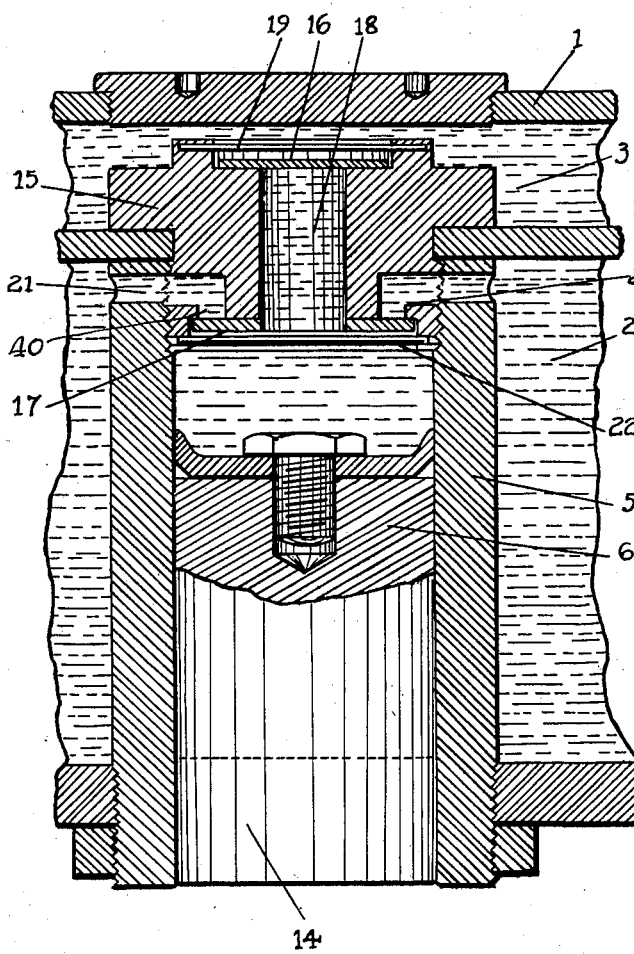
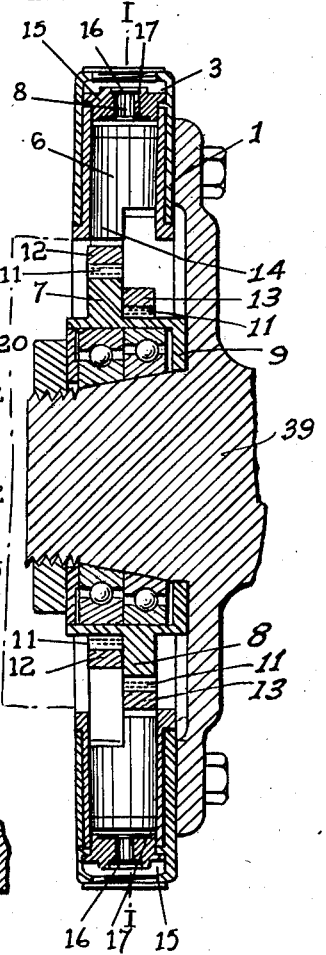
INVENTOR:
HENRI HERITIER.
By Chatwin & Company Attys.

Patented Mar. 24, 1936

2,035,387

UNITED STATES PATENT OFFICE 2,035,387

BRAKE FOR MOVABLE PARTS

Henri Heritier, Geneva, Switzerland

Application January 4, 1934, Serial No. 705,219
In Switzerland January 16, 1933

3 Claims. (Cl. 188—91)

The invention relates to brakes for movable parts, such for example, as the wheel of a vehicle.

It is characterized by the fact that it comprises a pump actuated by the movement of the movable part itself and working in a closed circuit, together with means for controlling the communication between the exhaust and the suction members of the pump and permitting in this manner to cause the latter to absorb a variable effort giving the braking effect.

The accompanying drawings show by way of example, a constructional form of the brake applied to the wheel of a motor vehicle.

Figure 1 is a cross section taken on the line I—I of Figure 2.

Figure 2 is a cross section taken on the line II—II of Figure 1.

Figure 3 is an enlarged longitudinal sectional view of one of the cylinder units taken on a plane transverse to that of Figure 2.

Figure 4 is an enlarged sectional view of the operating device connected with the distant control disposed near the driver's seat.

A stationary or fixed axle 39 of the motor vehicle is integral with a drum 1 housing internal chambers 2 adapted to contain a braking fluid such as oil or glycerine and forming a reservoir disposed between the radially disposed cylinders 5, and a peripheral collector channel 3. The chambers 2 communicate with each other, as will be hereinafter explained; one of them is connected to the channel 3 through a control device 4.

Between each pair of contiguous chambers 2 is disposed a radial cylinder 5, in which can move a piston 6 drawing in liquid or fluid from the chambers 2 and forcing same into the channel 3. The movement of the pistons takes place, at a given moment, by the rotation of the wheel (not illustrated) connected to the bell 9 rotatably mounted on the stationary axle 39 of same.

If the volume of fluid is increased and if the communication between the chambers 2 and the channel 3 is more or less broken or cut by means of the device 4, a more or less great resistance is opposed to the rotation of the said wheel, through the intermediary of work or movement in closed circuit of the pistons 6 in the cylinders 5 so bringing about a braking effort on the said wheel.

The cylinders are diametrically opposite each other in pairs: They can be fitted in the drum 1 or be cast therewith during the manufacture of the latter.

At the moment when the increase in volume of the fluid takes place, the pistons 6 are actuated by two eccentrics 8, 7 cast in one with a bell 9, attached to the wheel which latter is not illustrated, and are set at an angle of 180° in relation to one another. Each one of them carries, through the intermediary of rollers 10, separated by balls 11, an eccentric collar 12 or 13 with which three of the pistons 6 can be in engagement. For this purpose the pistons 6 have a beak cam or extension 14 situated at one side for the pistons of one group and on the other side for those of the other group. A piston of one of these groups is radially opposed to a piston of the other group in order to equilibriate the forces or efforts.

The cylinders 5 are closed at their outer ends by a plug 15 which is screw threaded, carrying exhaust valves 16 and suction valves 17 (Fig. 3). The plug 15 has a large axial channel 18 having its outlet in the collector channel 3 and capable of being closed by a metal plate 16 forming the exhaust valve the stroke or movement of which is limited by a small bar 19. The inner end of the plug 15 has passages 40 cut therein leading into an annular groove, which communicates with ports 21 formed in the cylinder. The movement of the valve 17 is limited by a small bar 22.

When the pistons 6 commence to move in the cylinders 5 by reason of the rotation of the bell 9 and the eccentrics 7, 8 in relation to the drum 1, the pistons draw in fluid from the chambers 2 through the valve 17 and drive it into the collector channel 3 through the valve 16.

The chambers 2 communicate together by the groove 20 provided on the external cylindrical surface of the plugs 15 and the ports 21 of the cylinders 5.

The arrangement 4 (Fig. 4) controlling the communications between one of the chambers 2 and the channel 3 comprises a cylindrical sleeve 23 parallel to the axis of the drum 1 extending from one of the faces (external) thereof to the other (internal) cast integral therewith and closed at both its extremities by screw covers 24, 25. The sleeve 23 has an opening or port 26 connecting the device to the channel 3 and two ports 27 and 28 which bring it into communication with the chamber 2. A slide valve 29 moves in the sleeve 23 on the one hand beneath the action of a spring 30 bearing on the cover 24, and on the other hand beneath the action of an oil pressure acting on one of its faces in a chamber 33 and arriving through a channel 31 provided in the cover 25. The valve 29 is a good fit in the sleeve 23; the chamber in which the spring 30 is disposed only containing air and not liquid. Should much liquid in time find its way into this chamber the liquid can easily be removed by unscrewing the screw cover 24. The slide valve has an annular groove 32 which serves to bring the two ports 26 and 27 into communication with each other, the spring 30 being of such length and strength, that when it is extended, the valve 29 is in the position in which the groove 32 is opposite the ports 26 and 27.

When the groove 32 wholly connects these two ports 26, 27 as is the case in Figure 4, the fluid driven or forced by the pistons 6 passes without difficulty from the channel 3 to the chamber 2 whence it is again aspirated. The resistance to the rotation of the wheel and of the drum is minimum or nil; therefore there is no braking effect.

If, on the contrary, the slide valve 29 more or less strangles the ports 26, 27, the pistons 6 must make an effort to exhaust the fluid; there is resistance to the rotation of the wheel and in consequence braking action obtains.

In order to brake, it is necessary to increase the pressure in the chamber 33. For this purpose the hole 31 of the cover 25 is connected to a distant control by a tube 34 to a device comprising a cylinder 35 enclosing a piston 36 connected to the pedal 37 of the car serving as brake and subjected to the action of a return spring 38.

The operation of the form of construction described, is as follows:

The chambers 2, the collector channel 3, the cylinders 5, the chamber 33 and the cylinder 35 are filled with fluid serving as braking liquid. Before the braking action and for reasons given later on in the description, the various pistons 6 are not in contact with the collars 12, 13 of the eccentrics 7, 8. If the vehicle is moving, the wheel turns with the bell 9 in relation to the drum 1 which is stationary, without the pistons 6 making any movement and without there being any braking action.

At the moment when the driver of the vehicle wishes to brake, he presses on the pedal 37 and by this action forces fluid from the cylinder 35 to the other parts of the apparatus which produces an increase of volume and consequently of the pressure of the braking fluid. This increase of pressure spreads through the chamber 33 and the port 28 into the chambers 2 and into the cylinders 5 through the suction valves 17 in such a manner that the pistons are maintained in contact with the eccentric collars 12, 13 during the braking operation causing these pistons to reciprocate and force the liquid in closed circuit into the channel 3. On the other hand, by continuing the pressure on the pedal 37, the slide valve 29 moves towards the right and begins to strangle the communication between the channel 3 and the chambers 2; there is a braking action the intensity of which depends on the degree of the strangling action produced by the prolonged action on the pedal 37. When all communication is broken between the channel 3 and the chambers 2 the pistons 6 can no longer move thus locking the wheel in relation to the axle. If the oil becomes hot during the braking action it can cool by its passage through the chambers 2 of the drum.

As soon as the driver releases the pedal 37, the spring 38 returns the piston 36 to its position of rest, the slide valve 29 returns to its initial position, the strangling effect on the communication between the channel 3 and the chambers 2 ceases as also does the braking action; the eccentric collars 12, 13 thrust back the pistons 6 to their outermost position and they remain in this position stationary until a new braking action occurs. The pistons are therefore stationary in their cylinders and free from contact with the eccentrics so long as there is no braking action.

The construction of the pump and of its control means may be different to that indicated.

I claim:

1. Brake for movable parts comprising cylinders which are radially disposed, the pistons of which pushed back by eccentrics, to cause the circulation of a braking fluid in a closed circuit and the passage of which through the connecting passage between the suction and exhaust ports can be regulated at will, characterized in that the cylinders are divided into two groups enclosed in a drum serving the purpose of a reservoir for the braking fluid, in such a manner that the cylinders of one group are diametrically opposite and alternate with those of the other group and are controlled by eccentrics set at an angle of 180° in relation to each other, the volume of braking fluid being capable of being varied by a single distant control device acting hydraulically from a distance simultaneously on all the pistons through the intermediary of the reservoir in communication with the cylinders which has for effect to push back the pistons against the eccentrics which then drive them, the pistons, in their movement, forcing the liquid from the cylinders into an annular collector channel communicating with the reservoir through a slide valve, all these parts being arranged in such a manner that when the pressure of the braking fluid increases in the reservoir under the action of the distant control device and the pistons are pressed against the eccentrics which give them a to and fro movement, causing circulation of the fluid between the reservoir and the annular collector by passing through the slide valve and that by continuing to exert the pressure from the distant control device, the fluid moves the slide valve and thus reduces the passage for the fluid from the annular collector channel to the reservoir, producing in this manner a continuous and progressive resistance to the rotation of the movable part, through the intermediary of the holding of all the pistons against the eccentrics.

2. Brake according to claim 1 characterized in that the slide valve between the collector and the reservoir comprises a slide moving in a sleeve having ports connecting said collector and reservoir.

3. Brake according to claim 1, characterized in that the drum has the shape of a hollow ring and houses the annular channel, chambers, and the cylinders with their pistons.

HENRI HERITIER.